United States Patent [19]
Yeiser et al.

[11] Patent Number: 6,159,551
[45] Date of Patent: Dec. 12, 2000

[54] WAX AND METHOD OF WAX APPLICATION

[75] Inventors: John Yeiser, Alpine; Robert M. Marchese, Irvine, both of Calif.

[73] Assignee: John Yeiser, Santee, Calif.

[21] Appl. No.: 09/258,715

[22] Filed: Feb. 26, 1999

Related U.S. Application Data

[60] Provisional application No. 60/076,103, Feb. 27, 1998.

[51] Int. Cl.⁷ ............................... B05C 13/00; B05D 1/34
[52] U.S. Cl. .......................... 427/426; 427/355; 427/384; 427/142
[58] Field of Search .................................... 427/355, 384, 427/397, 426, 142

[56] References Cited

U.S. PATENT DOCUMENTS

| | | |
|---|---|---|
| 2,584,413 | 2/1952 | Baer . |
| 2,780,554 | 2/1957 | Lerner . |
| 3,395,169 | 7/1968 | Mitchell . |
| 3,607,333 | 9/1971 | Alburger . |
| 3,715,227 | 2/1973 | Alburger . |
| 4,020,857 | 5/1977 | Rendemonti . |
| 4,051,806 | 10/1977 | Hanna ........................................ 118/63 |
| 4,113,677 | 9/1978 | Svedas et al. . |
| 4,404,035 | 9/1983 | Ona et al. . |
| 4,439,343 | 3/1984 | Albanese . |
| 4,462,828 | 7/1984 | Otsuki . |
| 4,592,934 | 6/1986 | Wolstoncroft . |
| 4,622,246 | 11/1986 | Takeuchi . |
| 4,781,946 | 11/1988 | Takeuchi ................................. 427/327 |
| 5,076,202 | 12/1991 | Falls . |
| 5,098,745 | 3/1992 | Gordon ................................... 427/355 |
| 5,258,063 | 11/1993 | Cifuentes et al. . |
| 5,626,653 | 5/1997 | Frazer et al. . |

*Primary Examiner*—Timothy Meeks
*Assistant Examiner*—Jennifer Kolb
*Attorney, Agent, or Firm*—William G. Lane

[57] ABSTRACT

A spray wax concentrate adapted to be applied in a highly diluted state in an aqueous spray to a surface, such as a vehicle surface, in the hot sun comprising about 2 to 10 wt. % of a fine polishing powder, of about 10 to about 40 wt. % of mineral spirits, of about 0.5 to about 3 wt. % of a dimethyl silicone fluid polymer, from about 0.5 to about 1.75 wt. % of an alkanolamide surface-active agent; from about 1 to about 1.75 wt. % of a higher alkyl amino functional group substituted dimethyl silicone polymer wax, and the balance, water, to obtain a total of 100 wt. %. The spray wax concentrate is preferably applied as pressurized, turbulent aqueous spray containing about 1 part by volume of the spray wax concentrate and about 40 to about 100 parts by volume of water.

1 Claim, No Drawings

WAX AND METHOD OF WAX APPLICATION

Applicant claims the benefit of prior filed co-pending Provisional Patent Application Ser. No. 60/076,103 for Improved Wax and Method of Wax Application filed on Feb. 27, 1998.

FIELD OF THE INVENTION

A wax/polish for automobiles, other vehicles, windows, and like surfaces, and methods of applying the wax/polish.

BACKGROUND OF THE INVENTION

Waxes and polishes have been used for at least several hundred years for waxing and polishing surfaces such as floors, windows, furniture, and vehicle surfaces. Originally, most waxes were paste waxes which required that the surface first be cleaned of all dirt and oxidation. The wax is then applied by hand or with a buffering-like device to rub the wax into the surface. The rubbing or buffing can cause swirling on the surface. The wax is allowed to dry and then it is rubbed or buffed off the surface. Preferably, the waxing is done on a clean, cool surface and not in direct sunlight. This application process is still used to some extent and is very labor-intensive and requires physical strength either to rub the wax on and buff it off, either by hand or with a mechanical buffing machine.

In the 1950's, liquid waxes became available. Liquid waxes are easier to apply than paste wax since they can be poured onto an applicator, such as a cloth, sponge, reinforced paper, or other type of applicator, and then rubbed or buffed onto the surface. The rubbing can leave swirling on the surface. The wax is allowed to dry and then it is rubbed or buffed off. Liquid waxes are similarly applied. The liquid waxes are preferably applied to a clean, cool surface and the waxing is not done in direct sunlight. In the 1970's, spray devices became available and waxes and polishes were developed that could be sprayed onto the surface. One type of device was the finger trigger sprayer commonly used for household cleaners and the like. The sprayer has a pump actuated by the finger which draws fluid up from a reservoir and sprays the fluid out of a nozzle. Waxes and polishes applied by this method have many of the characteristics of liquid wax and polish. These types of applicators have not been very popular because the sprayers only spray a limited amount of fluid for each finger pull of the sprayer and accordingly, it takes time to spray large surface areas such as a car, airplane, or other large vehicle. In addition, it is very tiring and can be painful to actuate the finger trigger sprayer for long periods of time. The wax or polish is preferably applied to a clean, cool surface and not in direct sunlight. Once the wax is sprayed on the surface, it is rubbed onto the surface to cover the surface and allowed to dry. The rubbing can leave swirls on the surface. After it is dried, it is rubbed off or buffed off, as with paste wax and liquid wax. Polishes normally do not have to be buffed.

A recent variation of the liquid wax is the wipe-on and hose-off wax. This wax is sprayed on the surface and rubbed in, or poured onto an applicator or directly onto the surface and rubbed into the surface. The rubbing can leave swirls on the surface. Once the wax is dry, it is hosed off with a water spray from a garden hose. Following removal of the wax with the hose spray, the vehicle has to be dried off. With this method of waxing, the hosing-off step does not guarantee that all the wax residue will be removed from the vehicle. It has been found that the user of the wax normally has to go back over the vehicle with a water spray after drying it to remove residual wax and then dry the surface again.

When applied to a hot surface, wax normally forms a hard coating or scum that adheres to the surface. Frequently, this coating or scum cannot be removed by rubbing or buffing. Frequently, these areas have to be removed by re-waxing, letting the application of fresh wax dry, then rubbing or buffing off the applied wax. It is for this reason that waxing, such as an automobile or other vehicle surface, is not done on a hot surface or under the sun.

The demarcation between a wax and polish is not a bright line. For purposes of this invention, the term "wax" will include both wax and polish.

SUMMARY OF THE INVENTION

The wax composition of the present invention has been termed a "spray wax concentrate" and is sometimes referred to as a spray wax and comprises a water base or carrier incorporating a surfactant, wax, silicone fluid, mineral spirits, and a mild inorganic polishing agent.

The spray wax of the present invention, when applied to a surface, such as a vehicle surface or glass surface, does not bead. The spray was forms a sheet or film of liquid which separates into an organic phase and an aqueous phase. The bulk of active organic ingredients report to the organic phase which adheres to the surface, whether the surface is horizontal or vertical. The fine polishing powder reports to both phases. The aqueous phase runs off the surface as a sheet leaving the organic phase adhering to the surface as a relatively continuous film. The organic phase, almost immediately upon application and clearly after separation of the aqueous phase, forms a white haze. The formation of the white haze appears to be independent of the drying of the organic phase. The white haze becomes more pronounced as the organic phase dries. Surprisingly, the hazy organic phase may be wiped off a minute or two after application and before it has dried. In fact, the surface should be fully wiped while still "wet" to ensure that the entire surface has been contacted or treated with the organic phase. Then the surface, which may or may not be dry to the touch, is wiped clean of the hazy film. When the hazy film has been wiped off the surface, the waxing is complete. Since the applied wax is not rubbed in, no swirl marks are created on the surface. On the average, the entire operation, from the step of wetting the surface with water to completion of the wiping-off step, for a vehicle, takes about ten minutes; however, it can take as little as two and one-half minutes.

The spay wax can be applied to windows as an aqueous spray to clean the windows. The finish on the windows so treated is superior to that of windows cleaned, polished and/or waxed with conventional window and glass cleaning, polishing, and/or waxing compositions. The spray wax will not smear the windows.

The spray wax can be applied on a hot surface, in the sun, on a wet surface, in the rain, on a cool day, or at night. Preferably, the spray wax is applied as an aqueous spray prepared from the spray wax concentrate and water on a hot or warm surface in the sun.

The spray wax concentrate of the present invention comprises a percent by weight (wt. %) from about 2 to 10 wt. % of a fine polishing powder; from about 10 to about 40 wt. % of mineral spirits; from about 0.5 to 3.0 wt. % of dimethyl silicone fluid polymer; 0.5 to 1.25 wt. % of alkanolamide surface-active agent; 1.0 to 1.75 wt. % of a higher alkyl amino functional group substituted dimethyl silicone polymer; and the balance water to obtain a total of 100 wt. %. Optionally, the spray wax can contain preservatives, colorant and/or fragrances.

The spray wax applied as an aqueous spray will not harm rubber, vinyl and other plastics and polymers.

In the preferred embodiment of the present invention, the spray wax concentrate, comprises about 4 wt. % anhydrous aluminum silicate; about 24 wt. % of mineral spirits; about 1.25 wt. % of a dimethyl silicone fluid polymer having a viscosity of about 350 c.s.(centistokes); about .8 wt. % of a non-ionic alkanolamide surfactant agent; about 1.3 wt. % of a higher alkyl-substituted amino functional group substituted dimethyl silicone; 0.005 wt. % of a preservative and about 68.6 wt. % water.

The spray wax concentrate can be applied with or without water. However, in the preferred embodiment of the invention, the spray wax is applied with water as an aqueous spray. The wax can be mixed with water in a bucket and applied with a rag. Preferably, the wax is applied with a venturi-type sprayer (also called an aspiration-type sprayer) using water as the transportation medium to draw the wax from a reservoir into a venturi tube and into the water stream to form an emulsion, i.e., the aqueous spray.

Venturi-type sprayers have been around ever since the advent of the garden hose. These sprayers use the Bernoulli principle to draw a composition through a straw from a reservoir and then inject it into a water stream to be sprayed out. They have been used commonly as garden sprayers for spraying insecticides, nutrients and the like. The sprayer is normally comprised of a reservoir containing a venturi draw tube going to the bottom of the reservoir. The spray element or nozzle increases the velocity of the water stream over a venturi hole in which the venturi exits. The increased velocity of the water stream places a partial vacuum at the venturi hole drawing up fluid from the reservoir and through the venturi straw. The fluid exits the venturi hole and enters the water stream where it is intimately mixed in the highly agitated, highly turbulent water stream. Some venturi-type sprayers have a closed system wherein the water is passed through a constriction at the area where the venturi hose is located. Other venturi-type sprayers eject the water as a spray over the venturi hole from a nozzle. A short downstream from the nozzle, the spray crosses over the venturi hole to create the partial vacuum and draw the composition from the reservoir. The venturi-type sprayers are preferred because they keep the mixing ratio of the spray wax concentrate and water, in the water stream, relatively constant.

The spray wax concentrate is intimately mixed in the turbulent water stream or spray of the sprayer to form a fine emulsion of an aqueous phase and organic phase, which coats the surface when the spray from the sprayer hits the surface. The dimethyl silicone fluid polymer, alkanolamide surface-active agent, and the higher alkyl and amino functional groups substituted dimethyl silicone polymer, and mineral spirits report primarily to the organic phase, where the mineral spirits function as a carrier. The fine polishing powder, e.g., anhydrous aluminum silicate powder, is distributed to both the aqueous phase and the non-aqueous phase. On application to the surface, the water phase separates from the non-aqueous or organic phase which contains the dimethyl silicone fluid polymer, a portion of the anhydrous aluminum silicate powder, mineral spirits, and the higher alkyl-substituted amino functional group dimethyl silicone polymer. The bulk of the water sheets off the surface leaving the non-aqueous or organic phase containing the fine polishing powder on the surface. The remaining material on the surface is allowed to either fully dry or (preferably) partially dry and then is wiped to leave a high gloss wax finish on the surface. The wiping acts as a polishing step, as well as a cleaning step.

Preferably, the surface is cleaned prior to the application of the spray wax. The cleaned surface can be wet when the wax is applied. The surface can optionally be prewetted with water. The prewetting with a water spray moistens and removes some of the dirt and dust on the surface and makes the adhering dirt more amenable to being removed with the components of the spray wax from the surface. Unexpectedly, the wax can be sprayed on a surface in the rain and the wax composition adheres to the surface, even vertical surfaces.

Using a water stream as the transportation medium for the spray wax onto a surface, such as a car surface, has several benefits. The wax can be quickly applied. The water flowing through a venturi-type sprayer is adjusted to between 3 to 5 gallons per minute although a lower or higher water flow rate can be used. Spray wax is drawn from the reservoir into the water stream at a ratio of about 20 to 200 parts by volume water to about 1 part by volume spray wax, preferably about 45 to 60 parts by volume water to about 1 part by volume spray wax. The application of the spray wax with the venturi-type sprayer has been found to remove dust and dirt from the surface. This saves a considerable amount of time.

The spray wax can also be applied by mixing the spray wax with water in a bucket and applying the mixture to the surface using an applicator, such as a sponge, chamois, towel, or the like. The spray wax is a two-phase system comprising an aqueous phase and an organic phase. The anhydrous aluminum silicate powder constitutes a solid phase. However, when the spray wax concentrate and water are sufficiently agitated, the anhydrous aluminum silicate powder is easily dispersed between the organic phase and the aqueous phase.

The phases separate with time. This phase separation is even faster when the spray wax is diluted with water. It has been found that when the spray wax is to be applied by hand from a spray wax-water mixture in a bucket, the ratio of spray wax to water be not less than 7 parts water by volume to 1 part spray wax by volume (also called "spray wax concentrate"). This dilution does not prevent separation but it slows its rate. When applying the spray wax in a water mixture by such application, the mixture of water and spray wax must be frequently agitated to disperse the organic phase throughout the water. The applicator will absorb some of the organic phase and some of the aqueous phase. Application of the wet applicator onto the surface remixes the organic phase into the aqueous phase to give a relatively uniform application of the spray wax to the surface. This method of application provides that the dirt and dust on the surface are rubbed and scrubbed away. The alkanolamide surface-active agent and the mineral spirits greatly aid in the cleaning of the surface while simultaneously waxing the surface.

Using the venturi-type sprayer to apply the spray wax in the water stream to the surface is the preferred method of application. The high-speed, turbulent water stream picks up the small amount of spray wax (20 to 200 parts by volume water to 1 part by volume spray wax), draws it into the stream from the venturi to break up the organic phase into very small droplets which are relatively evenly distributed through the water stream. Because the wax stream or spray hits the surface in a relatively short period of time (less than a second), uniform distribution of the organic phase in the aqueous phase remains intact. Once the aqueous phase and wax phase come in contact with the surface at a relatively high velocity, the aqueous phase and organic phase coat the surface with the organic phase displacing the aqueous phase and coating the surface, permitting the aqueous phase to coalesce and sheet off the car, leaving the organic phase coating the surface of the car.

The spray wax is specifically formulated to be thin enough, i.e., have a low enough viscosity, to be drawn through the venturi straw or tube from the reservoir of the venturi-type sprayer and to be drawn into the water stream. The viscosity is also adjusted so that the organic phase is easily dispersed into fine droplets of organic phase in the water stream. This ensures that the surface of the car is evenly coated with fine droplets of the organic phase which carry the wax, mineral spirits and the like.

Preferably, the spray wax is applied upon a warm surface, even a hot surface, and in the sun. The heat of a warm or hot surface and the heat from the sun dry the spray wax on the surface quickly and permit the surface to be wiped or rubbed down shortly after application, shortening the entire waxing and cleaning process. For some reason, the hot surface and/or the heat of the sun does not cause the spray wax to form a coating or cake on the surface, as it does with conventional waxes, which is very difficult, if not sometimes almost impossible, to remove without using a polishing or rubbing compound or more conventional wax.

The spray wax concentrate can be applied directly to the surface of a car to remove dust, dirt, and scum. In this application, the spray wax concentrate is applied directly to an applicator or sprayed onto the surface with a sprayer, such as a finger trigger-type sprayer. The spray wax is particularly effective in this mode for removing organic scum on the cars, such as tar deposits, oil deposits and the like. The wax is applied directly to the organic scum and then wiped off after a few seconds. For more difficult removal of dirt and scum, the spray wax can be allowed to remain on the scum or dirt for up to a minute before wiping off. It is believed that the mineral spirits in the concentrate soften the organic scum or dirt, permitting the aqueous phase of the spray wax concentrate with the surface-active agent to function as a detergent or soap to remove the organic scum and dirt deposit from the surface.

The present invention is also directed to a method of waxing a car by spraying an emulsion of an organic phase and aqueous phase onto a warm surface and allowing the applied emulsion to at least partially dry, and then wiping off the applied emulsion to yield a waxed surface, the emulsion formed by combining 1 part of a spray wax concentrate by volume with about 20 to about 200 parts by volume water. Lower ratios can be used but to no advantage. Higher ratios may be operational but have not been tested.

In the preferred embodiment of the above method, the surface is prewetted with a water spray to rinse off dust and dirt from the surface. Optionally, the surface may be washed with an aqueous soap or detergent solution and rinsed off with water prior to application of the emulsion.

In another embodiment of the present invention, a spray for waxing a surface is created which comprises an organic phase and an aqueous phase, the spray emulsion is created by drawing the spray wax concentrate into a spray of water by a venturi action at a rate of about 1 part by volume spray wax concentrate to 20 to 200 parts by volume of water, by formulation of the concentrate as described herein.

In an alternative embodiment of the present invention, a spray for waxing a surface comprising an emulsion of an organic phase and aqueous phase is created by drawing a spray wax concentrate by venturi action into a stream of water to form the emulsion of the organic phase and aqueous phase, propelling the emulsion through a nozzle to form a spray for waxing, comprising the organic phase and aqueous phase. The spray wax concentrate is of the formulation as described herein.

DETAILED DESCRIPTION OF THE INVENTION

The spray wax or spray wax concentrate comprises a surface-active agent, a fine polishing powder, mineral spirits, a dimethyl silicone fluid polymer, an alkanolamide surface-active agent, a higher alkyl-substituted amine functional group substituted dimethyl silicone polymer and water. The spray wax concentrate comprises between about 2–10 wt. % of fine polishing powder, preferably about 4 wt. %. The fine polishing powder is ground to a powder which promotes good suspension in most liquid systems and provides easy passage through venturi tubes. This powder is compatible with amine-functional group substituted silicones. The powder is inert, insoluble, and nonhydrosopic. This powder will not deteriorate in an aqueous or organic phase. In the composition, the powder performs several functions. The powder is finely ground and has an equivalent spherical diameter in microns, so that 100% of the fine polishing powder is less than 3 microns. The particle-size distribution, based on equivalent spherical diameter in microns, is such that 80% of the powder is less than 1.2 microns. 50% of the powder is less than 0.6 microns, and 20% is less than 0.3 microns. This distribution can vary but it is preferred that all the powder be less than 4 microns in size, and at least 80% of the powder be less than 1.2 microns in size. Aluminum silicate, aluminum oxide, silica, microcrystal silica, talc and Cabosil brand silica can be used in the spray wax. Anhydrous aluminum silicate powder is preferred. Any anhydrous aluminum silicate fine powder meeting the above criteria can be used in the present invention. Applicant has found that Kaopolite® SF anhydrous aluminum silicate is well-adapted for the present invention. Kaopolite® SF is supplied by Kaopolite Inc., 2444 Morris Avenue, Union City, N.J. 07083.

The fine polishing powder performs a number of functions in the composition. The powder functions as a pigment giving the spray wax, when applied to a surface, before and after drying, a white haze or white sheen which is easy for the operator to see when wiping off or rubbing off the wax after its application and/or after it is dried. The fine polishing powder also appears to enhance the amount of wax that adheres to the surface. The anhydrous aluminum silicate also appears to speed up the drying process, possibly by increasing the surface area of the applied spray wax. The sheeting off of water after application of the spray wax is an important advantage of the present spray wax. The fine polishing powder is crucial for the organic phase to cover the surface as a sheet or film. If the powder is omitted, the organic phase clumps or beads. The fine polishing powder also appears to minimize water spotting.

The sheeting off of the aqueous phase after application of the wax appears to enhance application of the spray wax to the surface. The increased surface area caused by the fine polishing powder increases sheeting of the water which allows the wax or organic phase to stick to the surface before running off the side of the surface with the aqueous phase. The fine polishing powder also acts as a mild abrasive or polish to help smooth the surface that is being waxed and it aids in removing any water spotting that might occur while using the product, which will be explained below.

It is believed that the wax in the organic phase first adheres to the surface upon application of the spray wax, and then the fine polishing powder adheres to the initial wax coating, and then additional wax in the organic phase adheres to the fine polishing powder building up the wax layer. Once the powder adheres to the wax, it increases the surface area, which provides additional surface for the wax to adhere to. Since a large quantity of water is used to transport and distribute a small quantity of spray wax concentrate onto the surface, it is preferable to have as much of the organic phase of the spray wax adhere to the surface directly or to the fine polishing powder before it runs off the surface with the transporting water medium.

The spray wax can be applied in dry, cool, hot, rainy, foggy or even freezing weather. The viscosity of the spray wax is thinned by the mineral spirits so that it can be drawn up through a venturi tube of a venturi tube type sprayer. It is believed that the mineral spirits also speed up the drying time of the spray wax after its application to the surface. The mineral spirits thin the organic phase and allow it to be more evenly distributed, both in the water spray stream and onto the surface where the spray wax is applied. Water spots often result after the drying of the spray wax on the surface. The mineral spirits seem to aid in minimizing water spots and making the water spots easily removed by a single swipe of a dry towel. The omission of the mineral spirits makes the concentrate thick and prevents its use in a venturi-type sprayer.

Almost all water coming from a hose contains mineral values, typically salts of sodium, potassium, calcium, magnesium with a carbonate, sulfate, silicate, and/or phosphate cation. If straight water is sprayed on a car or windows, and the car or window is allowed to dry, water spots will result. It is very difficult to remove such spots. Normally, the surface has to be washed again and/or a mild abrasive wax or polishing compound has to be used to remove the spots.

When the spray wax of the present invention is applied to a black or dark color surface with a venturi-type sprayer, the surface can be left to dry. Some water spots may appear but they are easily wiped off with a towel.

The spray wax composition also comprises from about 0.5 to about 3.0 wt. % of a dimethyl silicone fluid polymer having a nominal viscosity between about 10 to about 60,000 c.s., preferably about 350 c.s. Preferably about 1.25 wt. % of the dimethyl silicone polymer is used. Dimethyl silicone fluid polymers are well known and supplied by many manufacturers, such as Dow Corning, General Electric Corporation, Union Carbide Corporation, and Rhodia. L-45 dimethyl silicone fluid having a viscosity of 350 c.s. manufactured by Witco Corporation, One American Lane, Greenwich, Conn. 06831, has been found satisfactory.

Dimethyl silicone fluid polymers are used primarily as mechanical lubricants or as lubricants for plastic and rubber parts. They are especially effective in plastic or metal lubrication. They are also used as release agents for molding rubber, glass, plastic parts, or for shell and core molds. The dimethyl silicone fluid polymers of the present invention impart easy rub-out to the applied spray wax to resist oxidation of the surface and thus provide protection to the surface from oxidation and they give the waxed surface a deep gloss. The dimethyl silicone fluids are water insoluble and report to the organic phase and are soluble in the mineral spirits. The dimethyl silicone fluid polymer also gives the surface a high-gloss finish, after the wipe-off or rub-off, and a waxed or smooth touch. The silicone fluid appears to minimize water spotting. The silicone fluid also aids in uniform distribution of the organic phase of the spray wax to the surface after application. Since the silicone fluid does not quickly evaporate off the surface after application of the spray wax, it is believed that during the wiping-off, excess higher alkyl substituted amino functional group substituted dimethyl silicone polymer, the alkanolaminde surface active agent and any residual mineral spirits remain with the silicone fluid and are spread across the surface during the wiping. Thus, it appears that the silicone fluid aids in the even spreading of the organic phase on the surface.

The composition also contains from about 0.5 to about 1.25 wt. % of nonionic alkanolamide surface-active agent, preferably about 0.8 wt. %. It has been found that Witcamide® 511 surfactant, manufactured by Witco Corporation, is particularly useful in the present invention. Witcamide® 511 is an alkanolamide made by reacting an amine with a fatty acid, alkyl methyl ester or triglycerides in ratios which produce 1:1 or 2:1 amides. Witcamide® is a fatty acid alkanolamide which is liquid at room temperature, has a free amine content of 6.0 wt. %, and a free fatty acid content of about 1.3%. It is a known invert emulsifier for polishes and waxes, as well as hydraulic fluids. In the present invention, the alkanolamide performs a number of functions. It aids in emulsifying the organic phase and the aqueous phase during the application of the spray wax by a venturi-type sprayer. It permits the spray wax to be finely and evenly distributed into the water stream and spray from the sprayer so that a uniform application of the spray wax is applied to the surface. The alkanolamide also appears to function as a detergent and cleans the surface so that the wax, more correctly, the organic phase, will adhere to the surface. When no alkanolamide is utilized in the present invention, very little of the organic phase adheres to the surface and most of the organic phase, and thus most of the wax, runs off with the water from the surface. In addition, little, if any, haze is formed. It is believed that its omission results in most of the wax draining off the surface with the water leaving beads of aqueous phase containing some of the organic phase. If too much fatty acid alkanolamide is utilized, a smudge forms on the surface after application of the wax spray that makes it more difficult to wipe off the wax. Surprisingly, in order to apply the spray wax using a venturi-type sprayer, it has been found that the alkanolamide is absolutely essential to the composition.

The composition also comprises a higher alkyl-substituted amino functional group substituted dimethyl silicone polymer. This is deemed the wax component of the spray wax. The dimethyl silicone fluid imparts a sheen to a surface in conjunction with the wax component. In the spray wax concentrate, about 0.5 to about 3.0 wt. % of the higher alkyl-substituted amino functional group substituted dimethyl silicone wax is employed in the composition, preferably about 1.25 wt. %. The wax is a substituted dimethyl silicone fluid where the silicone backbone has been modified with higher alkyl organic substituents and amino functional groups. The waxes are also called amino functional dimethyl siloxanes polymers. By higher alkyl organic substituents, it is meant alkyl substituents having a molecular weight greater than methyl, such as ethylene, ethyl, propylene, propyl, butyl, amyl, hexyl, heptyl, octyl, nonyl, decyl, and the like. In addition, the backbone may be substituted with aromatic groups such as benzene, toluene, xylene, and the like. Such substituents combine the unique attributes of the dimethyl silicone portion with those of the substituted substituent, primarily greater water resistance and more hydrocarbon and wax-like properties. Applicant has found that AFL-5, manufactured by Witco Corporation, is a suitable substituted dimethyl silicone wax which can be employed in the present invention. The material has been used in polishes. The material has low surface energy, has good lubricity, low surface tension, a viscosity-shear relationship which is stable over a wide range of temperatures, has excellent thermal stability and can be used over a wide temperature range without the formation of undesired scum and deposits, and proved orientation of amino derivatives on the backbone. The wax is resistant to detergents and the weather. It has reactive amino functional groups. The amino functional chemical groups adhere to the surface, whether it is a painted surface, metal surface, vinyl surface, plastic surface, rubber surface or the like. In addition, the wax has a high refractive index and gives a very high gloss. Lastly, the wax has an ultra-high molecular weight which gives superior durability to the wax. The wax is employed in the composition for the above reasons; it gives the waxed surface a high gloss; and it gives it a protective coat against weathering and washing with detergents or soaps.

The balance of the spray wax concentrate is water which ranges from 88.3 to about 63 wt. %. Any good quality water can be utilized. Hard water is to be avoided. Distilled water can be used. Deionized water can be used. The water is to be free of suspended matter, have a neutral pH or near neutral pH (5.5 to 8.5 pH), and have a low to moderate hardness, i.e., a hardness of less than 50 ppm.

The above constituents can be added together in any order. Preferably, however, the constituents are formed into two pre-concentrates. Pre-concentrate A comprising anhydrous aluminum silicate powder and water, and optionally a preservative, such as Dowicil 75. The second pre-concentrate, pre-concentrate B, comprises the mineral spirits, the surface-active agent, the dimethyl silicone fluid, the higher alkyl-substituted amino functional group substituted dimethyl silicone polymer, and optionally a dye soluble in the mineral spirits and fragrances. The dye, fragrances and preservative are optional and are not required for practice of the invention. After the pre-concentrates A and B are prepared, they are mixed together to form the spray wax concentrate which has good stability. The pre-concentrates A and B must be mechanically mixed at least thirty minutes and preferably for an hour. The mixture is conveniently made in large amounts, over 100 gallons at a time, and constantly stirred while bottled which can take up to six (6) hours. The mixing is crucial. Mixing 300 gallons of concentrate with a propeller mixer at 300 to 1,000 rpm for one (1) hour has been found to be sufficient. The unbottled concentrate is stirred, however, during the filling operation until all 300 gallons have been bottled. This normally takes five (5) to six (6) hours. Spray wax concentrate that is insufficiently mixed does not spread evenly over a surface on which it is sprayed. Spray wax concentrate that is too energetically mixed, such as in a homogenizer, can form a thick mixture that cannot be sprayed. After appropriate mixing, the concentrate will separate into two phases over time. Accordingly before use, the concentrate is shaken to form an emulsion which has stability for several minutes before separation becomes apparent. At present, we are making the spray wax concentrate in 3,000 gallon batches with constant stirring during bottling (5 to 6 hours to bottle).

One of the most critical steps in formulating, i.e., forming, the wax spray concentrate, is the mixing of the components. The reason for this is not definitely known. However, it is believed that mixing further reduces the particle size, and possibly smoothes the particle surfaces, of the fine polishing powder and permits the organic and surface active ingredients to be absorbed and adsorbed in the particles and on the particle surface.

If the mixing agitation of the components is not energetic enough and/or long enough, the phase separates and sheeting of the aqueous phase is far less pronounced upon application if the spray wax concentrate is an aqueous spray.

Preferably, the mixture is stored or mixed for at least one-half (½) hour, preferably at least one (1) hour, with a propeller mixer at 300 to 1200 rpm. The spray wax concentrate is made in bulk and preferably is stirred or mixed continuously until the bulk mixture is bottled. The spray wax concentrates of the first bottles are mixed for one-half (½) to one (1) hour, and the unbottled spray wax concentrate is mixed continually for five (5) to six (6) hours until all is bottled. The difference in performance, i.e., phase separation and aqueous phase sheeting, between the first bottles and last bottles is relatively small if the spray wax concentrate is adequately stirred at the beginning.

If the spray wax concentrate mixture is mixed too energetically, the spray wax concentrate forms into a thick composition that cannot be applied with a venturi-type sprayer. For example, if the spray wax mixture is mixed in a homogenizer at 10,000 rpm, the resulting spray wax concentrate mixture can be so thick that it cannot be drawn up the straw in a venturi sprayer.

The spray wax is preferably applied as an aqueous spray prepared from the spray wax concentrate and water. The spray wax concentrate is highly diluted in the water. About 20 to about 200 parts by volume water are used for each part by volume of spray wax concentrate. This highly dilutes the organic phase. About nine (9) fluid ounces of spray wax concentrate are required to wax a full-size car. Assuming a ratio of 1 part concentrate to 60 parts water, the concentrations of the organic constituents in the aqueous spray are approximately as follows:

| Constituent | Wt. % |
|---|---|
| Polishing Powder | 0.03 to 0.16 |
| Mineral Spirits | 0.16 to 0.66 |
| Silicone Fluid | 0.008 to 0.05 |
| Surface-active agent | 0.008 to 0.021 |
| Dimethyl Silicone Polymer | 0.016 to 0.03 |

Spray wax is preferably applied using a venturi-type sprayer powered by the water from a garden hose. Normally, water pressure from 30 to 100 lbs. psi is sufficient to power the sprayer. The sprayer has a reservoir that will hold at least a halfpint of the concentrate. The water volume through the sprayer is preferably adjusted from 3 to 5 gallons per minute with a draw through the venturi so that the applicator spray from the venturi-type sprayer has a ratio of about 20 to 200 parts per water per 1 part spray wax by volume, preferably 45 to 60 parts water per 1 part spray wax concentrate by volume. The venturi-type sprayer is one of the oldest sprayer devices known and uses the Bernoulli principle for drawing up the spray wax from the sprayer reservoir into the water stream. The venturi sprayer can be an open system or a closed system. In the closed system, the water stream goes through a constriction which has the opening for the venturi straw under the reservoir. In an open system, a water spray exits a nozzle and the stream of water spray before it expands too greatly passes over the venturi hole for the venturi straw and draws up the spray wax. In both systems, the water has a high velocity and is highly agitated so that the spray wax drawn into the stream is immediately and rapidly broken up and evenly distributed throughout the water stream for application to the surface.

Preferably, the surface to be waxed is first cleaned. The surface can be left wet. The surface can also be prewetted with water. This wets the dirt and dust on the surface for a more effective cleaning of the surface by the spray wax. However, cleaning and/or prewetting is not required.

The spray wax is quickly applied to the surface. For a typical automobile surface, using 9 ounces of spray wax, the surface is quickly sprayed with the wax in 1 to 3 minutes. This has been found to be an optimum time to apply sufficient wax to provide a good wax application to surface of the vehicle. Shorter times can be used but it is very inconvenient for the operator to move around the entire vehicle surface to get an even application of wax in less than 45 seconds. Longer times can also be utilized but without advantage. It has been found that most vehicles can be quickly and evenly sprayed with the aqueous spray in one minute. It has also been found that all automobiles, including utility vans and trucks, can be waxed using 9 ounces of the spray wax concentrate. Naturally, large commercial trucks, often referred to as eighteen-wheelers, which include ten-wheelers and fourteen-wheelers, buses, and large motor homes, will require more than 9 ounces of spray wax concentrate. Airplanes and boats may require more or less concentrate, depending upon the size of the airplane or boat.

Preferably, the surface to be waxed is warm, if not hot. Preferably the surface is in the sun, utilizing the heat of the sun. The spray of water and spray wax will cool off the surface to some extent from the application of the cold water from the hose. However, when the surface is waxed in 3 minutes or less, the cooling is de minimis and the surface retains enough heat to help dry off the applied spray wax. When the spray wax is applied with the venturi-type sprayer, especially on the dark surfaces, a whitish haze immediately appears on the surface while the water sheets off the surface, whether it is a vertical surface or a horizontal surface. With the air temperature above 60° F., and the surface at least as warm and exposed to the sun, the applied spray wax will dry or at least partially dry within two minutes. Although the surface can be wiped off when it is fully dry, normally the surface is rubbed off when it is partially dry, using dry, soft towels. For a typical automobile surface, three or four towels measuring 24 inches×18 inches normally suffice to wipe down the entire car to dry the surface, leaving a high gloss sheen. The spray wax not only waxes the cars; it also cleans the car. It will remove most grime and dust from the vehicle surface. If the surface is particularly dirty because it has been exposed to mud and the like, most of the mud and heavy debris should be first washed off prior to applying the wax.

As mentioned earlier, the spray wax can also be applied by the old-fashioned bucket method. However, application with a venturi-type sprayer is preferred and is much easier and quicker The bucket is filled with a gallon to a half-gallon of water and 9 ounces of spray wax concentrate is added to the bucket. This mixture is stirred and a towel or other applicator is wetted with the fluid and applied directly to the surface. With each fresh application of composition from the bucket, the composition must be agitated to form an emulsion of the organic phase and aqueous phase. After application of the bucket composition to the surface, the surface is allowed to dry in the same manner as when the spray wax is applied with a venturi-type sprayer.

When the surface has oily deposits or tar-like deposits, the concentrate can be applied directly to such deposits prior to waxing to remove the deposits. As explained above, the mineral spirits appear to wet and soften the tar-like deposits and the oily deposits, permitting the aqueous phase with the emulsifier to break the adhesion of the oil deposits and tar-like deposits from the surfaces.

Not only can the spray wax be applied to painted surfaces, it can also be applied directly to metal surfaces, glass surfaces, and plastic surfaces.

EXAMPLE NO. 1

The following 13 formulations were prepared utilizing Kaopolite® 1168 brand aluminum silicate powder or Kaopolite® SF aluminum silicate powder, mineral spirits having a boiling point range between 200° F. and 250° F., dimethyl fluid silicone polymer having viscosity of 350 c.s., Witcamide® 511, alkanolamide, surfactant, polymer AFL-5, higher alkyl amino functional group substituted dimethyl silicone fluids, and water.

TABLE 1

| Formulation No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Water | 62 | 68 | 70 | 71.5 | 92.5 | 69 | 70 | 70 | 72.25 | 64 | 52 | 64 | 68.95 | 68.6 |
| Kaopolite ® SF | 10 | 5 | 3 | 3.5 | 1.0 | | | | | 11 | 12 | 7 | 4 | 4 |
| Kaopolite ® 1168 | | | | | | 3 | 5 | 3 | | | | | | |
| Mineral Spirits | 24 | 24 | 24 | 24 | | 23 | 20 | 22 | 22.65 | 20 | 40 | 23 | 24 | 24 |
| Silicone 350 c.s. | 1.25 | 1.25 | 1.25 | 1.25 | | 1.6 | 1.7 | 1 | 1.25 | 1.25 | 1.25 | 1.25 | 1.25 | 1.25 |
| Silicone ALE-75 | | | | | 1.0 | | | | | | | | | |
| Silicone 10,000 c.s. | | | | | | | 1.3 | | | | | | | |
| Witcamide ® 511 | 1.00 | .75 | .75 | .75 | | 2.0 | 1.0 | 1 | 1.00 | 1.00 | 1.00 | 1.00 | .75 | .8 |
| Polymer AFL-5 | 1.75 | 1.00 | 1.00 | 1.00 | | | | | 2.85 | 2.75 | 3.75 | 3.75 | 1.00 | 1.3 |
| Polymer ALE-75 | | | | | | 1.0 | 1.0 | 3 | | | | | | |
| Laponite RD | | | | | 1.5 | | | | | | | | | |
| Isopropanol | | | | | 6.0 | | | | | | | | | |

The formulas were prepared chronologically and tested. The best performer is Formula 14 and is preferred. However, Formula 13 works very well. The spray wax concentrate is prepared by mixing the water with the anhydrous aluminum silicate powder to form a part A formulation. The balance of the ingredients are mixed to form a part B formulation. The part A and part B formulations are then mixed together to form the spray wax formulation. The concentrate emulsion will separate into an organic phase and aqueous phase with time. The concentrate must be shaken or mixed prior to use to re-form the emulsion.

Each of the above formulas was tested by spraying an automobile in the hot sun with a venturi sprayer containing 9 ounces of the concentrate. The spray was delivered at a rate of 3–5 gallons per minute. Only formulations 10–13 gave satisfactory results. Formulas 12 and 13 were the best. They produced a high luster wax finish on unwashed automobiles and were easy to wipe off after the wax spray had partially dried on the vehicle after about two minutes. It takes about five minutes wipe the car dry.

We claim:

1. A method of waxing a surface comprising the steps of wetting the surface with water; forming an aqueous spray from a spray wax concentrate for waxing a surface comprising drawing by venturi action a spray wax concentrate comprising by weight percent (wt. %) for about 2 to 10 wt. % of a fine polishing powder; for about 10 to about 40 wt. % of mineral spirits; from about 0.5 to about 3 wt. % of dimethyl silicone fluid polymer; from about 0.5 to about 1.25 wt. % of an alkanolamide surface-active agent; from about 1 to about 1.75 wt. % of a higher alkyl amino functional group substituted dimethyl silicone polymer; and the balance water to obtain a total of about 100 wt. % into a turbulent high velocity water stream in a ratio of about 1 part by volume spray wax concentrate to about 40 to about 200 parts by volume to effectively and energetically mix the spray wax concentrate in the stream of water to form the aqueous spray; forming a hazy spray wax film on a surface by spraying the surface with the aqueous spray; permitting the applied aqueous spray to remain on the surface for at least one minute before wiping; wiping the hazy spray wax film on the surface to spread it over the surface; and wiping the hazy spray wax film off the surface to leave a waxed surface.

\* \* \* \* \*